(12) United States Patent
Witriol et al.

(10) Patent No.: US 7,653,694 B2
(45) Date of Patent: Jan. 26, 2010

(54) E-MAIL CONTAINING A WEB-BASED FORM

(75) Inventors: Daniel B. Witriol, Issaquah, WA (US); John M. Leen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 626 days.

(21) Appl. No.: 11/013,211

(22) Filed: Dec. 15, 2004

(65) Prior Publication Data
US 2006/0129645 A1 Jun. 15, 2006

(51) Int. Cl.
G06F 3/00 (2006.01)
G06F 3/048 (2006.01)
G06F 7/00 (2006.01)
G06F 15/16 (2006.01)
G06F 15/18 (2006.01)
G06F 17/00 (2006.01)

(52) U.S. Cl. .............. 709/206; 706/2; 707/1; 707/3; 709/200; 715/200; 715/210; 715/221; 715/222; 715/224; 715/226; 715/234; 715/709; 715/760; 715/780

(58) Field of Classification Search ........... 709/206, 709/200; 706/2; 707/1; 715/200, 210, 221, 715/222, 234, 226, 709, 760, 780
See application file for complete search history.

(56) References Cited

U.S. PATENT DOCUMENTS

| | | | | |
|---|---|---|---|---|
| 5,537,618 | A * | 7/1996 | Boulton et al. | 715/745 |
| 5,555,426 | A * | 9/1996 | Johnson et al. | 709/206 |
| 5,566,291 | A * | 10/1996 | Boulton et al. | 715/709 |
| 5,909,679 | A * | 6/1999 | Hall | 707/4 |
| 5,948,054 | A * | 9/1999 | Nielsen | 709/200 |
| 6,250,930 | B1 * | 6/2001 | Mintz | 434/323 |
| 6,480,885 | B1 * | 11/2002 | Olivier | 709/207 |
| 6,651,217 | B1 * | 11/2003 | Kennedy et al. | 715/224 |
| 7,017,112 | B2 * | 3/2006 | Collie et al. | 715/212 |
| 7,062,536 | B2 * | 6/2006 | Fellenstein et al. | 709/206 |
| 7,143,135 | B2 * | 11/2006 | Smith et al. | 709/204 |
| 7,296,017 | B2 * | 11/2007 | Larcheveque et al. | 707/6 |
| 7,334,187 | B1 * | 2/2008 | Stanciu et al. | 715/234 |
| 7,350,139 | B1 * | 3/2008 | Simons | 715/210 |
| 7,415,672 | B1 * | 8/2008 | Fortini et al. | 715/760 |
| 7,426,496 | B2 * | 9/2008 | Kristjansson | 706/10 |
| 7,437,376 | B2 * | 10/2008 | Sikchi et al. | 707/101 |
| 7,451,392 | B1 * | 11/2008 | Chalecki et al. | 715/234 |
| 7,496,837 | B1 * | 2/2009 | Larcheveque et al. | 715/237 |
| 7,509,353 | B2 * | 3/2009 | Kelkar et al. | 707/203 |
| 2002/0002494 | A1 * | 1/2002 | Beam et al. | 705/20 |
| 2002/0169841 | A1 * | 11/2002 | Carlson et al. | 709/206 |

(Continued)

*Primary Examiner*—Tonia L Dollinger
*Assistant Examiner*—Daniel C Murray
(74) *Attorney, Agent, or Firm*—Merchant & Gould

(57) ABSTRACT

A system and method is provided to enable an e-mail to display a Web-based form. A definition concerning an e-mail address may include form schema owned by a Web site. Alternatively, the definition may contain a link to a Web service that provides the form schema. An e-mail client may download the form schema from the Web service, preferably along with additional data such as information concerning previous e-mails sent to the e-mail address, a FAQ list concerning an e-mail distribution list if the e-mail address represents the e-mail distribution list, etc. The Web site owning the form schema may receive and process e-mail containing the form according to the metadata of the Web-based form.

18 Claims, 5 Drawing Sheets

U.S. PATENT DOCUMENTS

| | | | |
|---|---|---|---|
| 2002/0188683 A1* | 12/2002 | Lytle et al. | 709/206 |
| 2003/0028600 A1* | 2/2003 | Parker | 709/206 |
| 2003/0074235 A1* | 4/2003 | Gregory | 705/4 |
| 2003/0105824 A1* | 6/2003 | Brechner et al. | 709/206 |
| 2003/0233353 A1* | 12/2003 | Taylor | 707/3 |
| 2004/0039990 A1* | 2/2004 | Bakar et al. | 715/505 |
| 2004/0189716 A1* | 9/2004 | Paoli et al. | 345/853 |
| 2004/0268229 A1* | 12/2004 | Paoli et al. | 715/508 |
| 2005/0004885 A1* | 1/2005 | Pandian et al. | 707/1 |
| 2005/0198563 A1* | 9/2005 | Kristjansson | 715/507 |
| 2006/0010054 A1* | 1/2006 | Gee | 705/35 |
| 2006/0059434 A1* | 3/2006 | Boss et al. | 715/780 |
| 2008/0066020 A1* | 3/2008 | Boss et al. | 715/968 |

* cited by examiner

*OneNote E-mail Form*

☐ To... (202) — OneNote Users
☐ Cc... (204)
SUBJECT: (206) — OneNote search doesn't find what I write by hand TYPE: Problem Report
FEATURE AREA: (210) (212) — Ink & Pen
PRODUCT VERSION: (214) — 11.5510.5606
OPERATING SYSTEM: (216) — Windows XP SP1
PRIORITY: (2) Normal PROBLEM DESCRIPTION
I take notes in meetings using the pen. When I later search for the notes on my tablet, it doesn't return them. It does return the notes when I search on my desktop. What's going on?

ERROR MESSAGE — OneNote Found 0 Matches

COMMUNITY (230) ☒ (232)
- Community members (234)

Latest e-mails on this alias
- What is OneNote?
- OneNote crashes on me
- Help Me Community FAQ: (236)
- What is it?
- Is it right for me?
- How to use it?

You have posted 15 times to this community
View your posts... (240)
View all posts... (242)

SEND (244)

E-MAIL CONTAINING A WEB-BASED FORM

FIELD OF THE INVENTION

The invention relates to computer software and, more particularly, to e-mail and Web content.

BACKGROUND OF THE INVENTION

Currently, when a user has a problem with a product and seeks technical support, the user needs to contact the technical support staff through e-mail, telephone, or through some online Web-based form system. Typically, a user seeks technical support by submitting a Web-based form. In less formal environments, such as corporate scenarios, a user is more likely to obtain non-urgent technical support through e-mail as it is easily accessible to all.

Usually technical support staff need to collect specific information in order to answer successfully an incoming support request. For software technical support, the information often includes the version of the product in use, what operating system the product runs on, what area of the product the problem lies in, and what error message appears. Users are often unaware of the specific information needed by technical support staff. Hence, incoming e-mails requesting technical support often lack the complete set of specific information that technical support staff need to successfully answer the e-mail.

Further, e-mail contents are usually unstructured. Thus, processing of requests sent by e-mail often is a manual and time-consuming process. For example, a support staffer needs to read an e-mail request, then mark it up with metadata or categorize it, then route it to the proper support staffer overlooking a specific area. Often the support staffer needs to send questions back to the user to get the proper details about the problem.

E-mail may be designed to contain form fields requesting specific information from a user and presenting the information in a structured manner. However, such e-mails are difficult to build and data from such e-mails are difficult to aggregate and manage.

On the other hand, Web-based forms provide structures for data concerning a problem, thus enabling technical support staff to quickly process the data. But Web-based forms usually lack the convenience and versatility of e-mails, which support quick target ad hoc communication.

Often a specific e-mail distribution list may be designated to receive and address questions and issues concerning a product or service. Usually, a user has no knowledge about an e-mail distribution list before the user sends information to the e-mail distribution list. Often a user wonders whether the e-mail distribution list is the correct one for the type of question the e-mail is addressing. Furthermore, a user who posts a question to an e-mail distribution list often has no knowledge about whether the e-mail question has already been asked. One of the most common complaints on many product or service support distribution lists is that the same questions are asked over and over again. Usually a frequently asked question (FAQ) list is provided to help solve this issue. However, FAQ lists usually are not discoverable from an e-mail distribution list.

Therefore, there exists a need to eliminate the cumbersome manual steps in processing information submitted in unstructured e-mail help requests. There is also a need to combine a Web-based form with e-mail so the form in an e-mail can be easily built and processed. There is a further need to enable a user to have easy access to information concerning an e-mail distribution list.

SUMMARY OF THE INVENTION

The invention addresses the above-identified needs by providing a computing system, a method, and a display device for displaying and processing an e-mail form. An e-mail form is an e-mail that displays a form based on form schema, i.e., data for rendering the form, associated with a Web site. In a conventional manner, a user enters an e-mail address into e-mail or simply selects an e-mail address from a global address book in an e-mail directory. If the e-mail address is associated with Web-based form schema, once the e-mail address resolves, the corresponding form is presented inside the e-mail. After a user finishes composing the e-mail, including entering data into the form, the e-mail form is sent. Upon receiving the e-mail form, an e-mail enabled Web site associated with the destination address. retrieves data concerning the form, such as metadata describing the nature of the form. The data concerning the form can be used to route the e-mail form to a person designated to respond to the e-mail form. The data entered into the form is thus made available to the person designated to address questions or issues contained in the e-mail form.

In accordance with one aspect of the invention, an e-mail address, such as an e-mail address for a distribution list, is associated with a form whose form schema is Web-based. Upon resolving the e-mail address, an e-mail client receives the form schema and displays the corresponding form in the e-mail that is directed to the e-mail address.

In accordance with another aspect of the invention, a form schema is included in the e-mail address object, i.e. a definition of the e-mail address, that is stored in an e-mail directory. In one exemplary embodiment, an e-mail enabled Web site is associated with an e-mail address. The Web site populates the corresponding e-mail address object with the form schema stored in the Web site. Microsoft.RTM. Exchange servers and other e-mail servers support a number of custom fields that can be used to store form schema.

Alternatively, the e-mail address object in the e-mail directory may include a link to a Web service providing the form schema. After receiving the e-mail address object, the e-mail client queries the Web service and retrieves the form schema to render the form. The e-mail client may also be able to download additional data from the Web service. For example, the e-mail client may be able to obtain information concerning the most recent e-mails sent to the e-mail address. It may also be able to obtain the FAQ list for the distribution list represented by the e-mail address. The e-mail client may also be able to display information concerning the members of the distribution list.

In accordance with yet another aspect of the invention, upon receiving an e-mail form, the Web site associated with a destination e-mail address in the e-mail form retrieves metadata of the Web-based form from the e-mail form. The form metadata can be used to route the e-mail form to a specific technical support staffer previously identified to address specific issues contained in the e-mail form.

In accordance with a further aspect of the invention, if the form submission is incomplete or invalid, the Web site sends a reply to the sender of the e-mail. Preferably, the reply contains a link to a page containing the form for the sender to fill in. In the case that the submitted form misses certain data, i.e., is incomplete, the Web site reply then contains a link to a page containing the submitted form, preferably along with a suggestion for the missing data, for the sender to edit.

In summary, the invention associates e-mail with a Web-based form. The association allows the e-mail and any data entered into the form to be received and processed by an e-mail enabled Web site. If the e-mail destination address is an e-mail distribution list, the e-mail can also display information derived from the distribution list, such as previously posted e-mails and a FAQ list. As a result, the invention enables an e-mail to provide specific and relevant information in a structured way. The invention also provides a user composing an e-mail directed to a distribution list easy access to information derived from the distribution list. Such access avoids re-posting issues that have been previously addressed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a pictorial diagram illustrating an alternative exemplary e-mail form;

DETAILED DESCRIPTION OF THE PREFERRED EMBODIMENT

In hereinafter described embodiments of the invention, an e-mail address is associated with a Web-based form. The e-mail address may also be associated with an e-mail enabled Web site storing the form schema for rendering the form. Upon resolving the e-mail address, an e-mail client retrieves the form schema and displays the form in an e-mail directed to the e-mail address. A user composing the e-mail may enter data into the form. The e-mail client then sends the e-mail, including the form and any data entered by the user, to the Web site, which processes the e-mail form according to metadata in the form.

A web site associated with an e-mail address that is capable of receiving and processing e-mail directed to the e-mail address, is called herein an e-mail enabled Web site. An exemplary implementation of an e-mail enabled Web site is described in detail in a related U.S. patent application Ser. No. 11/012,528 titled "Enable Web Sites to Receive and Process E-mail," filed concurrently with this application, which is incorporated herein by reference (hereinafter "E-mail Integration patent application").

Figure 1:
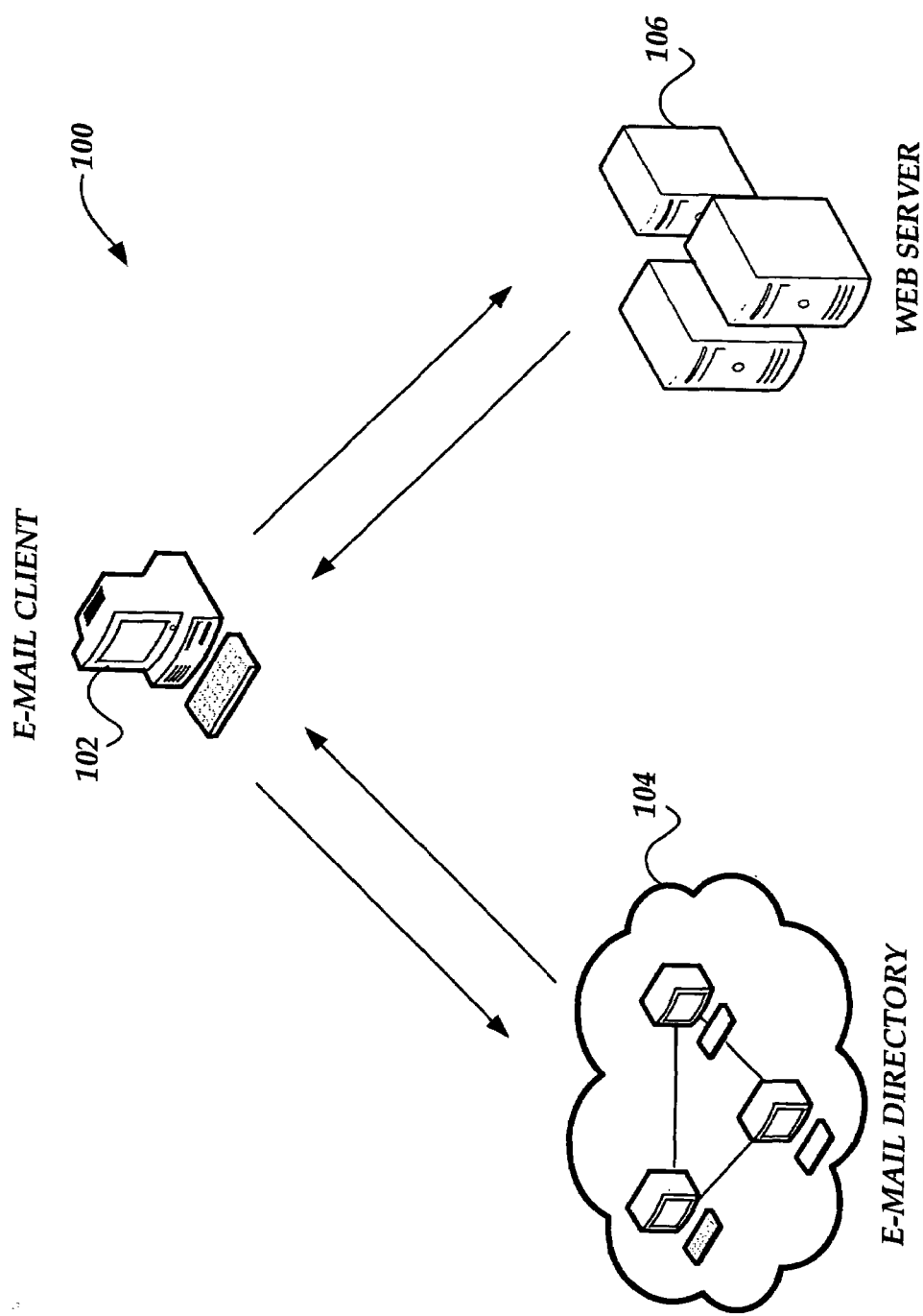
FIG. 1 is a pictorial diagram illustrating an exemplary computing system for implementing the invention.

FIG. 1 is a block diagram illustrating an exemplary computing system 100 that may be used to implement the invention. The computing system 100 includes at least one e-mail client 102, an e-mail directory 104, and a Web server 106. The computing system 100 may be a single-computer system. The computing system 100 can also be a distributed computing system, wherein the e-mail client 102, the e-mail directory 104, and the Web server 106 reside on different computers and communicate with each other through one or more networks, which are not shown in FIG. 1 in order to avoid unduly complicating the figure.

After an e-mail address is entered in one of the e-mail destination fields such as the "To," "Cc," and "Bcc" fields in an e-mail, the e-mail client 102 queries the e-mail directory 104 to resolve the e-mail address. The e-mail directory 104 returns the definition of the e-mail address, i.e., the e-mail address object, to the e-mail client 102. If the e-mail address is associated with a form, the e-mail address object returned by the e-mail directory 104 to the e-mail client 102 includes the data required to render the form, i.e., the form schema, or a pointer to the form schema, as discussed more fully below. The e-mail client 102 displays the form using the received form schema. After a user composes the e-mail, including entering data into the form, the e-mail client 102 sends the e-mail, including the form and any data entered by the user to the Web server 106. The Web server 106 receives and processes the e-mail, for example, by storing it in a Web site associated with the e-mail address, and retrieves and processes the data concerning the form, such as metadata describing the location the e-mail form should be routed to for a reply.

In some embodiments of the invention, the e-mail address object may include the Web-based form schema. In such embodiments of the invention, the Web site associated with the e-mail address supplies the form schema to the e-mail directory, such as the e-mail directory 104 illustrated in FIG. 1. The e-mail server hosting the e-mail directory conventionally can provide a number of custom fields that can be used to store the form schema. When the e-mail address object is created, it is populated with the form schema stored in the Web site associated with the e-mail address. For example, as described in the E-mail Integration patent application referenced above, a Web site may have an e-mail enabled discussion board. The discussion board can be customized to include form fields such as "product version," "operating system," etc. The form fields can be multi-line text fields, choice fields, numerical fields, currencies, etc. When the form fields are created, they can be pushed into the e-mail address object associated with the e-mail enabled discussion board. When e-mail is directed to the e-mail address, the e-mail client 102 receives the e-mail address object containing the form schema from the e-mail directory 104. E-mails sent to the e-mail address may be archived in the Web site, which also retrieves metadata of the form and routes the e-mail form according to the metadata.

Figure 2:
FIG. 2 is a pictorial diagram illustrating an exemplary e-mail form.

FIG. 2 is a pictorial diagram illustrating an e-mail 200 containing a Web-based form. The Web site has an e-mail distribution list (hereinafter "DL") whose e-mail alias is "OneNote Users," which implies that the DL is for users of a product named "OneNote." As shown in FIG. 2, besides the standard e-mail fields such as the "TO" field 202, the "CC" field 204, the "SUBJECT" field 206, and a message body field 208, the e-mail 200 also contains multiple form fields. For example, one of the form fields is a "feature area" 210 that identifies the specific feature at issue in the product. The e-mail 200 also contains a form field "product version" 212 that identifies the version of the product. Further, the e-mail 200 uses the form field "operating system" 214 to identify the operating system on which the product is running. Additionally, the e-mail 200 provides a form field "priority" 216 that indicates the urgency level of the form submission.

In some embodiments of the invention, e-mail may also contain a link to the Web site associated with the destination e-mail address. The Web site archives all e-mails sent to the destination e-mail address. For example, FIG. 2 illustrates that the e-mail 200 contains a link 220, the actuation of which leads a user to the Web site that archives all e-mails sent to the e-mail address "OneNote Users."

In other embodiments of the invention, instead of including the form schema, the e-mail address object may include a link to a Web service providing the form schema. After receiving the e-mail address object, the e-mail client 102 queries the Web service and receives the form schema. For example, one of the Web services is the Simple Object Access Protocol (SOAP) messaging framework. As those skilled in the art and other fields know, SOAP is a lightweight protocol intended for exchanging structured information in a decentralized, distributed environment.

Besides the form schema, preferably, the e-mail client 102 is also able to retrieve additional data from the Web service. For example, the e-mail client 102 may be enabled to retrieve information about the last five e-mails sent to the e-mail address. Also preferably, the e-mail client 102 is able to retrieve a FAQ list concerning the DL represented by the e-mail address and information concerning members of the DL. By retrieving the additional information, the e-mail client 102 can help a user to identify issues that have been previously addressed, thus reducing e-mail communication.

In such versions, the e-mail 200 can display information in addition to the form. FIG. 3 is a pictorial diagram illustrating an alternative implementation of the same e-mail 200 illustrated in FIG. 2, with additional information about the DL represented by the e-mail address "OneNote Users." As shown in FIG. 3, the e-mail 200 further contains a community panel 230. The community panel 230 includes a link 232 that displays the membership of the DL. The community panel 230 also displays the latest three e-mails 234 sent to the DL. It further displays a FAQ list 236 of the DL. For example, as shown in FIG. 3, the FAQ list 336 may answer questions such as what the DL is about, whether a user should post a particular message to the DL, and how to use the DL. The community panel 230 may additionally display the number of e-mails the user composing the e-mail 200 has sent to the DL. The community panel 230 may allow the user to view these e-mails by actuating the "View Your Posts" link 240. In addition, the user may view all the e-mails sent to the DL by actuating the "View All Posts . . ." link 242.

In embodiments of the invention, the e-mail 200 contains a SEND button 244. The actuation of the SEND button 244 causes the e-mail client 102 to package up the form data in the e-mail 200 and send it along with the e-mail 200.

Figure 4:
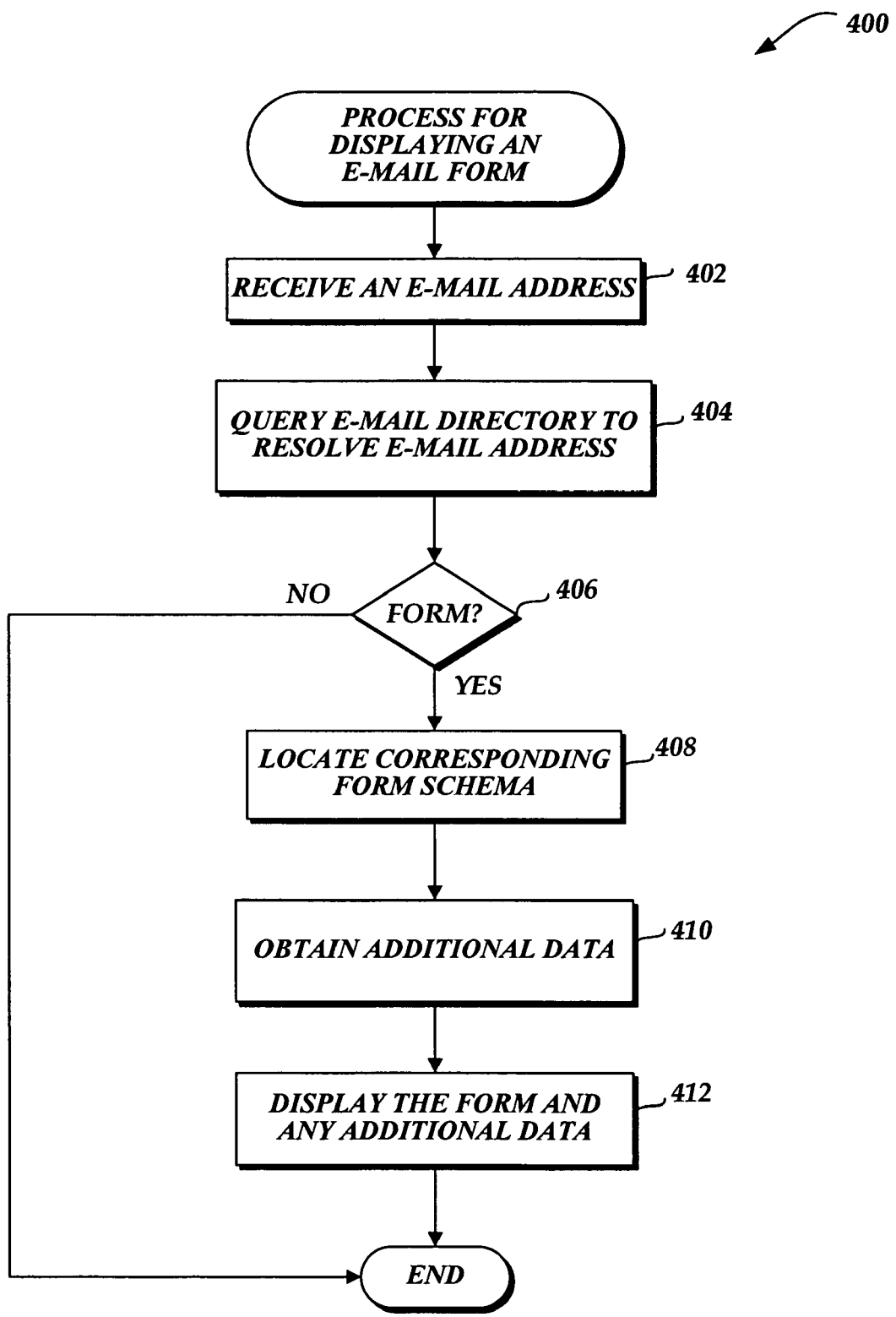
FIG. 4 is a flow diagram illustrating an exemplary process for displaying an e-mail form.

FIG. 4 illustrates an exemplary implementation of a process 400 for displaying an e-mail form such as the ones illustrated in FIGS. 2 and 3. The process 400 is initiated upon receiving an e-mail address. See block 402. This happens, for example, when a user enters an e-mail address while composing e-mail in an e-mail client such as the e-mail client 102 illustrated in FIG. 1. The process 400 then queries one or more e-mail directories 104 to resolve the e-mail address. See block 404. In some embodiments of the invention, an e-mail address may be mapped to a DL. In the case that the e-mail address is associated with a Web-based form (see decision block 406), the process 400 proceeds to locate the corresponding form schema. See block 408. As noted above, in some embodiments of the invention, the Web site owning the form schema has populated the e-mail address object with the form schema. In such embodiments, the e-mail client 102 receives the e-mail address object containing the form schema from the e-mail directory 104. In some other embodiments of the invention, the e-mail address object includes a link to a Web service providing the form schema. In such embodiments, the e-mail client 102 queries the Web service to receive the form schema. The e-mail client 102 may also receive additional data. See block 410. As noted above, the additional data may include information concerning the most recent e-mails sent to the e-mail address. If the e-mail address represents a DL, the additional information may include a FAQ list of the DL and information concerning members of the DL. The process 400 then displays the form and/or any additional data in the e-mail. See block 412. The process 400 then exits.

After a form has been displayed in the e-mail, the user composing the e-mail enters specific information and actuates the SEND button 244. The e-mail form, along with the specific information provided by the user, is then received and processed by a Web server such as the Web server 106 illustrated in FIG. 1. The Web server retrieves metadata from the form in the e-mail form. The Web server then processes the e-mail form according to the metadata.

Figure 5:
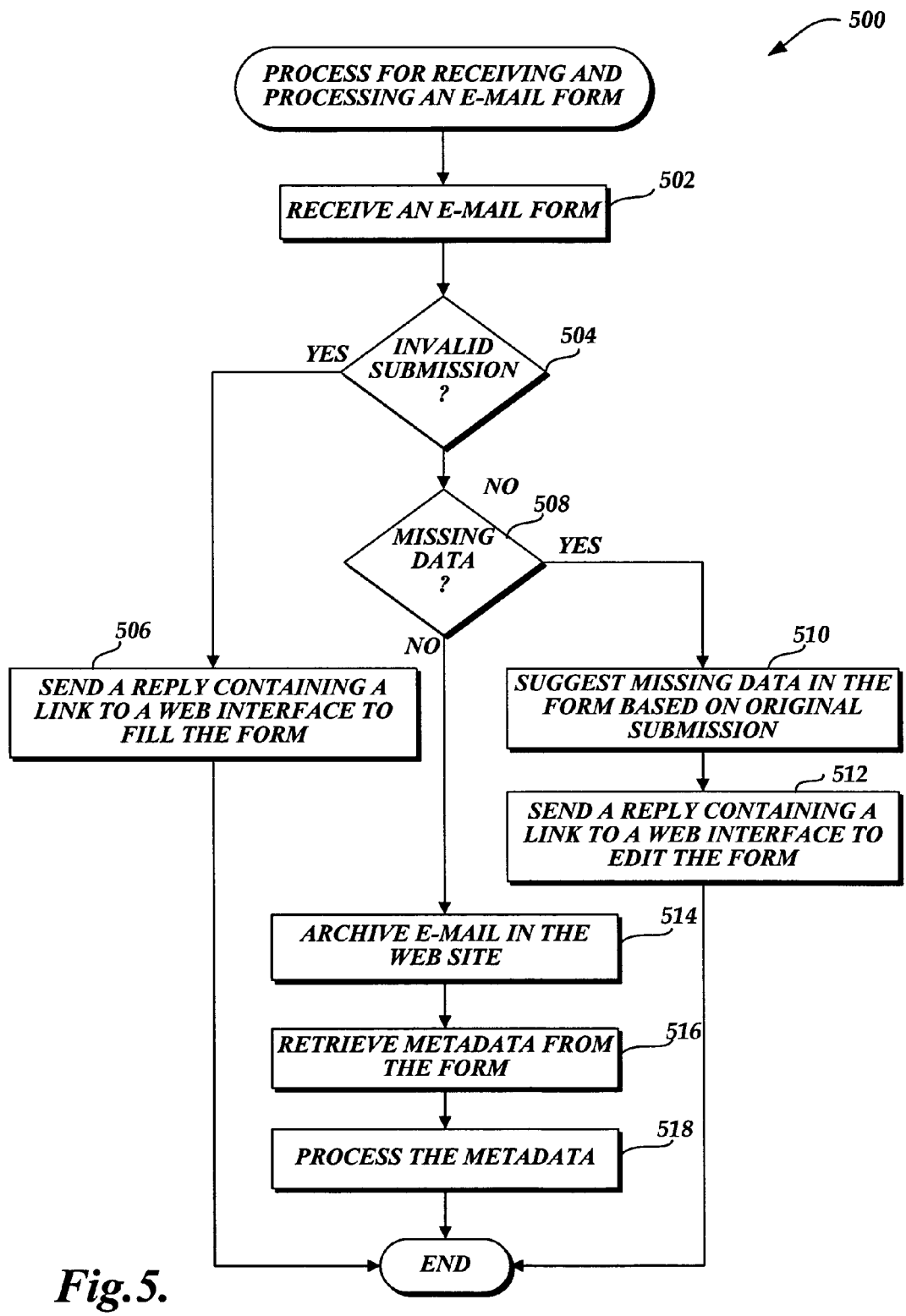
FIG. 5 is a flow diagram illustrating an exemplary process for receiving and processing an e-mail form.

FIG. 5 illustrates one exemplary implementation of a process 500 for processing an e-mail form. Upon receiving an e-mail form (see block 502), the process 500 proceeds to determine if the submission of the e-mail form is valid. See decision block 504. A form submission is invalid when, for example, a value entered in one of the form fields is invalid, e.g., exceeding the possible range of the value. A form submission can also be invalid when no data is supplied to a required field.

If the submission is invalid, the process 500 bounces a reply back to the sender of the e-mail form, the reply containing the text of the original e-mail form and a link to a Web page that contains the form for the sender to fill in. See block 506. The process 500 then exits.

If the answer to decision block 504 is NO, meaning the submission of the e-mail form is valid, and data in the e-mail form is generally accurate, the process 500 proceeds to check if the e-mail form is missing any data. See decision block 508. If the answer is YES, preferably, the process 500 proceeds to suggest the missing data based on content in the submitted e-mail form. See block 510. For example, the process 500 can create a data entry based on the content in the submitted e-mail form. The process 500 then sends a reply to the sender of the e-mail form, the reply containing a link to a Web page that contains the submitted e-mail form, preferably along with the suggested data entry so the sender may edit the suggested data entry. See block 512. The process 500 then exits.

If the submission of the e-mail form is valid and the content in the e-mail form is complete, the process 500 may archive the e-mail form in the Web site associated with the e-mail address that the e-mail is directed to. See block 514. The process 500 retrieves the metadata of the form from the e-mail form. See block 516. In some embodiments of the invention, the process 500 first retrieves the metadata included in the e-mail form, then makes the e-mail form available on the Web site. The process 500 then processes the e-mail form according to the metadata. See block 518. The metadata can be used to organize the e-mail form and route the e-mail form to the right individual. For example, technical support staff can submit queries on the Web site or create a rule in their inboxes to be notified of incoming e-mail forms that are tagged in a particular way by the metadata. Such a tag can be, for example, "'problem area' is equal to 'printing.'" The routine 500 then exits.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for displaying an e-mail containing a Web-based form, the computer-implemented method comprising:
   receiving an e-mail address in an e-mail client;
   in response to receiving the e-mail address in the e-mail client, resolving the e-mail address, wherein resolving the e-mail address comprises:
      querying at least one e-mail directory to resolve the e-mail address, the e-mail address being associated with the Web-based form, wherein querying the at least one e-mail directory comprises:
         locating a form schema associated with the e-mail address and a corresponding Web site, and
         populating an e-mail address object with the form schema, and
      receiving the e-mail address object containing the form schema from the Web site;
   upon receiving the e-mail address object containing the form schema, displaying the Web based form in the e-mail client;
   receiving a signal to send the Web based form; and
   sending the e-mail containing the Web based form along with data associated with the Web-based form upon receiving the signal to send the Web based form, wherein sending the e-mail containing the Web based form along with the data associated with the Web-based form comprises sending the e-mail to a Web server configured for:
      receiving the e-mail containing the Web based form,
      processing the Web based form, wherein processing the Web based form comprises processing the data associated with the Web based form to determine a person designated to respond to the Web based form, and
      routing the Web based form to the determined designated person.

2. The computer-implemented method of claim 1, wherein populating the e-mail address object with the associated form schema comprises including a link to a Web service that provides the form schema.

3. The computer-implemented method of claim 2, wherein receiving the e-mail address object containing the form schema from the Web site further comprises providing additional data that can be downloaded along with the form schema.

4. The computer-implemented method of claim 3, wherein providing the additional data comprises providing the additional data comprising: an item selected from a group comprising frequently asked questions, previous e-mails directed to the e-mail address, and information concerning a recipient of the e-mail.

5. The computer-implemented method of claim 4, wherein providing the additional data comprising the item selected from the group comprising the frequently asked questions associated with an e-mail distribution list, the e-mail distribution list comprising at least one of the following:
   a description of the distribution list;
   a purpose of the distribution list; and
   a method of using the distribution list.

6. The computer-implemented method of claim 1, wherein sending the e-mail containing the Web based form along with the data associated with the Web based form further comprises sending metadata describing a nature of the Web based form.

7. A computing system for displaying and processing an e-mail containing a Web-based form, the computing system comprising:
   a Web server operatively associated with a first computer of the computing system configured to:
      host an e-mail directory,
      provide custom fields used to store a form schema,
      process the Web-based form according to metadata located in the Web-based form,
      determine, based on the processed metadata, a location the Web-based form should be routed, and
      route the Web-based form to the determined location; and
   an e-mail client operatively associated with a second computer of the computing system configured to:
      receive an e-mail address,
      in response to receiving the e-mail address, resolve the e-mail address wherein the e-mail client being configured to resolve the e-mail address comprises the e-mail client being further configured to:
         query at least one e-mail directory to resolve the e-mail address, wherein the e-mail address is associated with the Web-based form and a corresponding Web site:
         locate a form schema associated with the e-mail address,
         populate an e-mail address object with the associated form schema, and
         receive the e-mail address object containing the form schema from the Web site, and
      display the Web-based form upon receiving the e-mail address object containing the form schema, from the Web server, for rendering the Web-based form.

8. The computing system of claim 7, wherein the e-mail address object populated with the associated form schema comprises includes a link to a Web service that provides the form schema.

9. The computing system of claim 8, wherein the e-mail address object containing the form schema received from the Web site further operative to provide additional data that can be downloaded along with the form schema.

10. The computing system of claim 9, wherein additional data provided comprises: an item selected from a group comprising frequently asked questions, previous e-mails directed to the e-mail address, and information concerning a recipient of the e-mail.

11. The computing system of claim 10, wherein the additional data provided comprises the item selected from the group comprising the frequently asked questions associated with an e-mail distribution list, wherein the e-mail distribution list comprises at least one of the following:
   a description of the distribution list;
   a purpose of the distribution list; and
   a method of using the distribution list.

12. The computing system of claim 7, wherein the web server is further configured to send the Web-based form along with data associated with the Web-based form upon receiving a signal to send the Web-based form.

13. The computing system of claim 12, wherein the Web server is further configured to receive and process the e-mail form along with the data associated with the Web-based form.

14. The computing system of claim 13, wherein the Web server being further configured to process the Web-based form along with the data associated with the e-mail comprises the Web server being configured to:
   retrieve the data associated with the Web-based form from the e-mail; and
   process the data associated with the Web-based form, wherein the Web server being configured to process the Web-based form associated with the data comprises the Web server being configured to:

determine whether the Web-based form is one of the following: valid and invalid in response to a determination that the Web-based form is invalid, send to a sender of the Web-based form a link to a page containing the Web-based form in an e-mail form for the sender to fill-in, in response to a determination that the Web-based form is valid, determine whether the Web-based form is complete, and in response to a determination that the Web-based form is not complete, suggest missing data based on content in the e-mail.

15. The computing system of claim 13, wherein the Web-based form is archived in a Web site associated with a destination address of the Web-based form.

16. The computing system of claim 13, wherein, in response to suggesting missing data based on the content in the e-mail for the sender to edit, the Web server is further configured to send a reply to the sender containing suggestions for missing data for the sender to edit.

17. A display device having rendered thereon a form in an e-mail, the display device comprising a window for:
  receiving an e-mail address in an e-mail client;
  in response to receiving the e-mail address:
    querying at least one e-mail directory to resolve the e-mail address, the e-mail address being associated with the form, wherein querying the at least one e-mail directory comprises:
      locating a form schema associated with the e-mail address, and
      populating an e-mail address object with the associated form schema, and
    receiving the e-mail address object containing the form schema associated with the e-mail;
  displaying the e-mail, wherein the e-mail includes the form that is associated with a destination e-mail address of the e-mail;
  displaying a panel including information concerning the destination e-mail address with which the form is associated; and
  sending the e-mail containing the Web based form along with data associated with the Web-based form upon receiving a signal to send the Web based form, wherein sending the e-mail containing the Web based form along with the data associated with the Web-based form comprises sending the e-mail to a Web server configured for:
    receiving the e-mail containing the Web based form,
    processing the Web based form, wherein processing the Web based form comprises processing the data associated with the Web based form to determine a person designated to respond to the Web based form, and
    routing the Web based form to the determined designated person.

18. The display device of claim 17, wherein displaying the panel comprises displaying information associated with at least one of the following:
  latest e-mails sent to the destination e-mail address;
  how many times a user composing the e-mail has directed e-mails to the destination e-mail address;
  all e-mails directed to the destination address;
  a recipient of the e-mail; and
  a FAQ list concerning an e-mail distribution list if the destination e-mail address is associated with the e-mail distribution list.

* * * * *